United States Patent [19]

Bradley et al.

[11] Patent Number: 4,857,492

[45] Date of Patent: Aug. 15, 1989

[54] TRANSITION METAL ORGANOSOLS STABILIZED BY ORGANOMETALLIC POLYMERS

[75] Inventors: John S. Bradley, Gladstone; Ernestine W. Hill, Piscataway, both of N.J.

[73] Assignee: Exxon Research and Engineering Company, Florham Park, N.J.

[21] Appl. No.: 174,135

[22] Filed: Mar. 28, 1988

[51] Int. Cl.$^4$ .................... B01J 31/12; B01J 31/14; B01J 31/02

[52] U.S. Cl. .................... 502/117; 502/102; 502/154; 502/171; 502/173; 502/320; 502/332; 502/333; 502/334; 502/335; 502/346; 252/309

[58] Field of Search ............. 502/102, 117, 154, 171, 502/173, 320, 332, 333, 334, 335, 346; 252/309

[56] References Cited

U.S. PATENT DOCUMENTS 4,252,678  2/1981  Smith ............................ 502/173 X
4,394,293  7/1983  Gratzel et al. .................. 502/173 X

FOREIGN PATENT DOCUMENTS 0109878  9/1978  Japan ................................ 502/173

*Primary Examiner*—Patrick P. Garvin
*Attorney, Agent, or Firm*—Ronald D. Hantman

[57] ABSTRACT

A polymer stabilized colloidal transition metal solution wherein the monomer unit of the polymer has the chemical formula $R_xMO$, where M is a metal, R is an alkyl group, and x is two less than the valence of M.

5 Claims, 1 Drawing Sheet

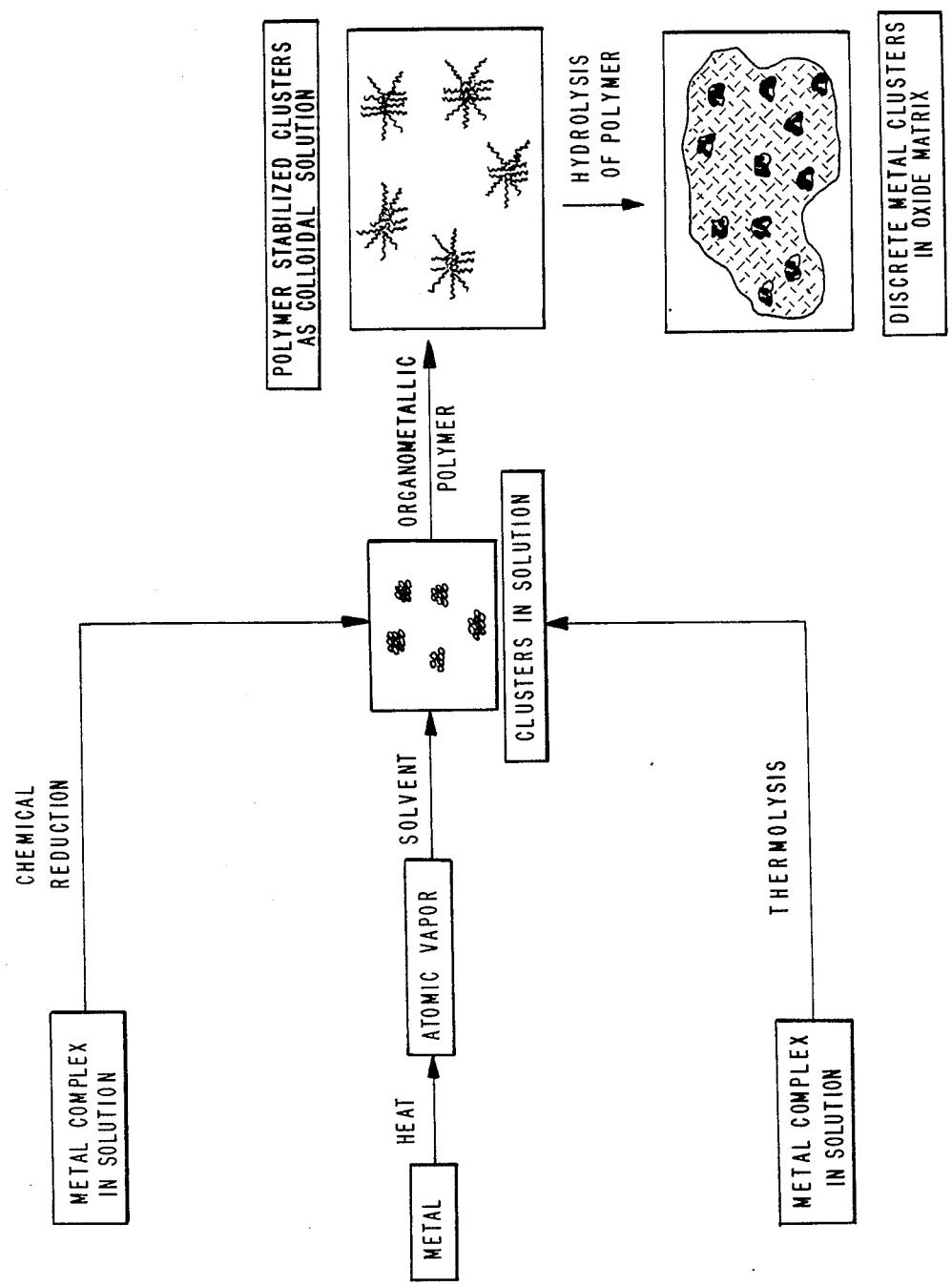

TRANSITION METAL ORGANOSOLS STABILIZED BY ORGANOMETALLIC POLYMERS

The present invention is a composition of matter which includes a polymer stabilized colloidal metal solution. The solution includes small metal clusters which may be used directly for catalytic activity in the liquid phase or to produce discrete metal clusters in a solid matrix which also can be used for catalytic activity.

The metal clusters are prepared in various ways, including the condensation of transition metal vapors into organic liquids, the reduction of metal complexes to the metal in solution, and the thermal decomposition of metal complexes in solution. In order to prepare extremely finely divided metals in a tractable form as a colloidal solution, it is necessary to stabilize the colloidal metal particles against agglomeration and precipitation from solution. For aqueous colloids, or colloidal solutions in polar media, this is often accomplished by electrostatic repulsion - the colloid particles bear a net charge. A more general means of stabilizing colloids, and one applicable to organosols in non-polar media as well as in aqueous media, involves the use of polymeric additives.

It is known that organic polymers have the ability to stabilize colloids and prevent their coagulation from solution. One means by which this is achieved is by adsorption of the polymer molecule to the surface of the colloidal particle (steric stabilization). To be effective in this respect, the stabilizing polymer must be "compatible" with both the dispersed phase and the diluent phase. Thus, copolymers containing monomers with an adsorbing functionality and those with a solubility enhancing functionality can sterically stabilize a colloidal solution. Organic polymers have been used to stabilize metal colloids prepared by reduction of metal salts in aqueous and non-aqueous solutions. They have also been reported to stabilize cobalt colloids formed by the thermal decomposition of cobalt carbonyl in a high boiling organic solvent, see U.S. Pat. No. 4,252,674 and P. H. Hess et al, *J. Appl. Poly. Sci.*, 10, (1966). They have also been used to stabilize colloids prepared from metal vapors (see for example C. G. Frances and P. L. Timms, J. Chem. Soc, 1977, 466).

The present invention discloses the use of organometallic polymers to stabilize transition metal colloids.

SUMMARY OF THE INVENTION

The present invention is a polymer stabilized colloidal metal (M) solution wherein the polymer is an organometallic polymer. The polymer, whose monomer unit contains a second metal M', is soluble in an inert liquid, and interacts with the colloidal particles of M so as to solubilize the particles of M in the liquid. The polymer is also able to react with water so as to produce the oxide of M', $M'_2O_z$ or its hydrate.

In a preferred embodiment, the metal M is a transition metal; in particular, palladium, platinum, copper, nickel, cobalt or chromium. The polymer has the formula $(R_xM'O)_n$ where R is an alkyl group, cycloalkyl group or an alkoxy group and M' is a metal and x is two less than the valence of the metal M' and n is the number of monomer units. In another preferred embodiment, the liquid, is an organic liquid. In a more preferred embodiment, M' is aluminum and R is isobutyl.

BRIEF DESCRIPTION OF THE DRAWINGS

The sole FIGURE is a schematic diagram of the preparation of polymer stabilized colloidal solutions of the present invention.

DESCRIPTION OF THE PREFERRED EMBODIMENT

As described above, the present invention is composition which includes a polymer stabilized colloidal metal solution. The metal is present in the solution in the form of clusters. The metal clusters may be generated in a number of ways, among them the condensation of the vapor of the transition metal vapor into a cold solution of the organometallic polymer in an organic solvent. Another means of generating the transition metal clusters is by the thermal decomposition of a complex of the transition metal. In this method the transition metal complex is heated to its decomposition temperature in a solution of the polymer in an organic solvent. Another method of forming the transition metal clusters is by the chemical reduction of a transition metal compound to the metal in a solution of the organometallic polymer in an organic solvent. It is anticipated that any chemical or physical method of generating elemental metals in a highly dispersed form in the presence of a solution of the polymer in an organic solvent will result in the formation of the stabilized colloids which are the subject of the present invention.

The present invention provides the use of an organometallic polymer to stabilize transition metal microcrystallites in a fluid matrix.

The polymers used in the present invention are chosen on the basis of several criteria. Since the colloidal metal solutions are in organic solvents, the polymer must be soluble and stable in the organic solvent of choice under the conditions used to generate the metal clusters. For example, if the clusters are to be generated by the condensation of metal vapors into a cold solution of the polymer, the polymer must be soluble in the solvent at the temperature of the condensation experiment. Alternatively, if the clusters are to be generated by the thermal decomposition of a metal complex at a high temperature, the polymer must be stable in the solvent at the temperature used to decompose the complex. A second criterion is that the polymer must contain functional groups which interact with the solvent used, so that the metal clusters are stabilized and solubilized in the solvent. A third criterion is that the polymer must have chemical properties consistent with the planned use for the colloidal solution. In the case of the present invention one of the uses of the colloidal solutions is to prepare oxide supported metal clusters. Accordingly a beneficial property of the organometallic polymers used in the present invention is that they are easily hydrolyzed by reaction with water to the hydrated oxide of the metal which is the constituent of the polymer. Thus a solid oxide containing clusters of the colloidal metal can be prepared by reacting the colloidal metal solutions with water. A collateral benefit of the reactivity of the polymer is that it reacts readily with hydroxyl groups on the surface of metal oxides such as alumina, silica and other oxides which are widely used as supports for metal catalyst particles. Thus colloidal solutions of metal clusters stabilized by the organometallic polymers of the present invention can be used as a source of preformed metal clusters for supporting an oxides by allowing the polymer to react with the hydroxyl groups of the oxide.

In the preferred embodiment of the invention, poly(isobutylaluminoxane), $(iC_4H_9AlO)_n$, was used as the stabilizing organometallic polymer for metal colloids. Aluminoxanes are organometallic polymers of general formula $(RAlO)_n$, synthesized by the partial hydrolysis of trialkylaluminums $R_3Al$. Addition of one mole of water to one of trialkylaluminum results in the hydrolysis of two aluminum carbon bonds:

$R_2AlOH + R_3Al \rightarrow R_2Al\text{—}O\text{—}AlR_2 + RH$

The dimer itself reacts with more water, or with a further mole of $R_2AlOH$ and the oligomer forms according to $(n+2)R_3Al + (n+1)H_2O \rightarrow R_2AlO(RAlO)_nAlR_2 + (2n+2)RD$ The oligomer with R=isobutyl is very soluble in hydrocarbons.

As shown below, poly(isobutylaluminoxane) and its homologs behave as organometallic soluble supporting polymers for small metal particles in organic colloidal solutions.

EXAMPLE 1

The figure summarizes the preparation of polymer stabilized colloidal solutions of metals by three possible routes. These are the chemical reduction of a dissolved metal complex, the condensation of metal vapors into a solution, and the thermal decomposition of a metal complex to the metal in solution. Each of these procedures when performed in the presence of an organometallic polymer results in the formation of a stable colloidal solution of the metal.

Preparation of Poly(isobutylaluminoxane)

A solution of tri-isobutyl aluminum in toluene (50 mL of a 1.0M solution) was diluted to 250 mL with dry toluene (distilled from sodium benzophenoneketyl) and cooled in an ice bath, under an atmosphere of nitrogen. To the stirred solution was added water (900u, 50 mmole) in nine equal amounts at ten minute intervals. The solution was stirred and allowed to come to room temperature. Toluene was distilled from the product solution under reduced pressure, leaving a colorless viscous gum. After pumping at room temperature for one hour, the product was dissolved in dry distilled methylcyclohexane (200 mL).

Condensation of Palladium Vapor Into Poly(isobutylalumoxane) in Methylcyclohexane A solution of poly(isobutylaluminoxane) (from 50 mmole triisobutylaluminum) in methylcyclohexane (200 mL) prepared as above was run into the evacuated 5L flask of the metal vapor synthesis reactor. The flask was cooled to $-120°$ C. in a refrigerant bath and rotated at ca 100 rpm. When the vapor pressure had equilibrated to $10^{-2}$ torr the system was opened to the diffusion pump. A dynamic vacuum of $5 \times 10^{-5}$ torr was thus achieved. Palladium metal was heated in the resistive furnace at the center of the reactor, and when the temperature of the metal had risen just above its melting point (1555° C.) a brown color developed in the polymer solution film on the walls of the rotating flask as palladium vapor condensed into the liquid. After an appropriate amount of time for the evaporation of the desired quantity (0.1-2.0 g) of palladium (derived by experience) the furnace was cooled and the flask allowed to warm to room temperature. The deep brown solution produced was transferred under helium to an evacuated Schlenk tube, and then to a helium filled glove box. After filtration through a medium porosity glass frit to remove any bulk metallic palladium precipitate (which to varying degrees forms in these experiments) the solution was passed through a 0.2 m millipore filter and stored under helium for further use.

The solution was analyzed for palladium content as follows: A stream of nitrogen gas was sparged through a reservoir of deoxygenated water, and the water saturated gas bubbled through an aluminoxane stabilized metal colloid solution. As the aluminoxane hydrolyzed, precipitation occurred, and the gray precipitates were collected and dried at 100° C. Thermogravimetric analysis of the hydrolyzed precipitate from a pure aluminoxane solution revealed it to be $Al(O)OH.H_2O$. Elemental analysis of the precipitate from hydrolysis of the palladium colloid revealed that $>80\%$ of the evaporated palladium had dissolved and been stabilized in colloidal form.

Preparations of colloidal solutions of cobalt, copper and nickel were accomplished by resistive evaporation of the metals into methylcyclohexane solutions of poly(iso-buthylaluminoxane), in a manner identical to that described for palladium above.

EXAMPLE 2

Preparation of a Platinum Colloidal in Methylcyclohexane Stability by Poly(isobutylaluminoxane)

Colloidal solutions of a less volatile metal, platinum, were prepared in a similar manner, but the lower volatility of platinum (vapor pressure of 10 at 2090° C., compared with 1566° C. for palladium) required the use of electron beam evaporation. Since platinum requires heating to over 300.C above its melting point to achieve an adequate rate of evaporation, a modified hearth liner was fabricated from graphite rod to prevent prohibitive heat losses from the molten platinum to the water cooled copper hearth. Even with this modification the amount of platinum condensed from the vapor into the liquid phase was significantly less than the 80% found for resistively evaporated metals, and this is presumably due to condensation of the vapor on the cool surfaces of the electron gun components before it leaves the region of the gun (see below).

Platinum outgasses quite vigorously above its melting point, and the spitting of the molten metal can result in fragments of metal being ejected from the hearth of the electron beam furnace, and even the loss of the entire charge of molten metal into the cold reaction flask. To avoid this the platinum, charged to the furnace as a powder, is melted and carefully outgassed in an air cooled flask, the metal cooled in vacuo, and the flask which is now coated with a platinum mirror is replaced with another into which the polymer solution is placed.

A solution of poly(isobutylaluminoxane) (prepared as in Example 1 from 50 mmol. of triisobutylaluminum) in methyl cyclohexane (200 ml.) was degassed through three freeze-pump-thaw cycles and added to the evacuated reactor flask of the reactor. The flask was cooled to $-120°$ C. and rotated at ca. 120 rpm. When the vapor pressure had equilibrted at $10^{-3}$ torr the system was diffusion pumped to $5\times 10^{-5}$ torr, and platinum metal was evaporated into the polymer solution from the hearth of a 2 KW electron beam furnace mounted near the center of the flask. After heating well above the melting point of the metal a brown color became noticeable in the liquid film. After an appropriate time the furnace was cooled and the flask allowed to warm to room temperature. The deep brown liquid was transferred to a Schlenk tube. Any bulk metal suspended in the liquid product was removed by passage through a 0.2 m. teflon filter, and the colloidal platinum solution was stored under helium. Analysis of the precipitate formed by hydrolysis of the platinum colloid revealed that 30% of the platinum evaporated (typically 1.5 g) had dissolved and been stabilized in colloidal form.

EXAMPLE 3

Preparation of colloidal metal by thermal decomposition of a metal complex in the presence of poly(isobutylaluminoxane). To a solution of poly(isobutylaluminoxane) (prepared as in Example 1, from 10 mmol. tri(isobutyl)aluminum), in decalin (50 mL.) was added dicobalt octacarbonyl (0.342 g., 1 mmol) and the solution was boiled under reflux for five hours. The resulting colloidal cobalt solution was filtered as in Example 1.

What is claimed is:

1. A polymer stabilized collodial metal (M) solution wherein said metal, M' is a transition metal and said polymer is an organometallic polymer having the monomer unit with the chemical formula $(R_x'O)$ where R is an alkyl group, cycloalkyl group or an alkoxy and M' is any metal satisfying said formula and x is 2 less than the valence of M' and wherein said polymer is soluble in an inert liquid, interacts with said collodial particles of M so as to solubilize said particles of M in said liquid, and able to react with, water so as to produce the oxide of M', $M'_2O_z$ or its hydrate $M'_2O_z-nH_2O$, where z is the valence of M' and n is the number of molecules of water.

2. The polymer stabilized colloidal metal solution of claim 1 wherein said transition metal is selected from the group consisting of palladium, platinum, copper, nickel, cobalt and chromium.

3. The polymer stabilized colloidal metal solution of claim 1 wherein said liquid is an organic liquid.

4. The polymer stabilized colloidal metal solution of claim 1 wherein said M' is aluminum.

5. The polymer stabilized colloidal metal solution of claim 1 wherein said R is isobutyl.

* * * * *